May 7, 1957 F. B. WHALEN 2,791,419
AUXILIARY SPRING FOR VEHICLES
Filed April 13, 1954
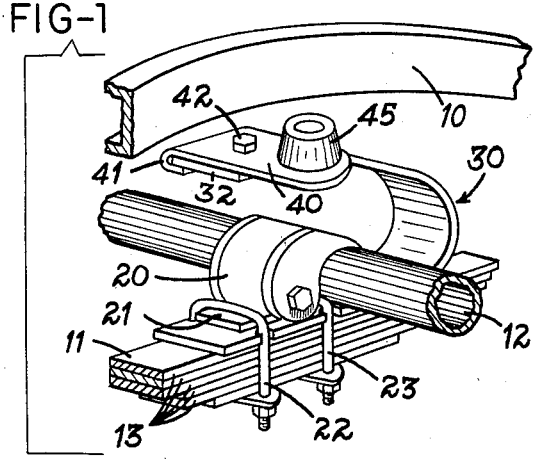
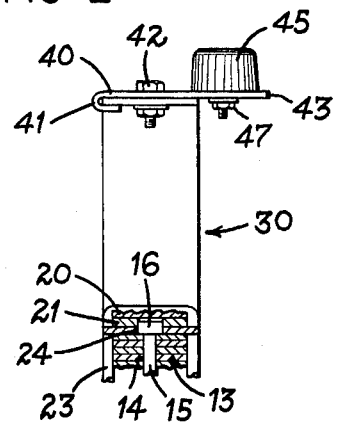
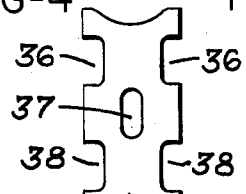
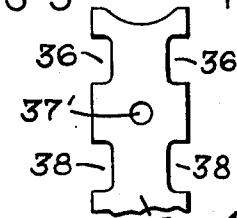
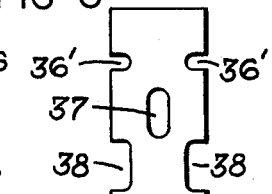
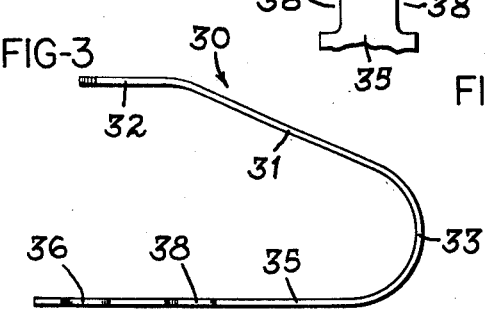
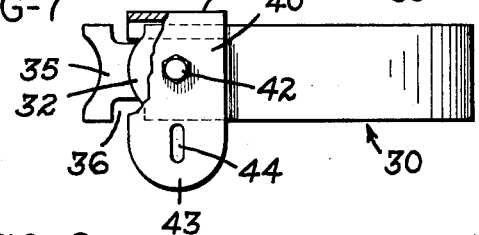
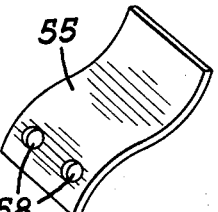
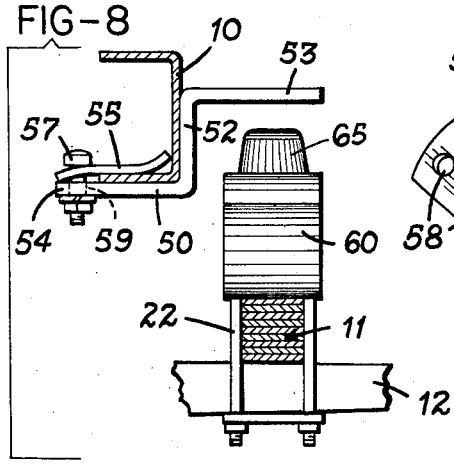
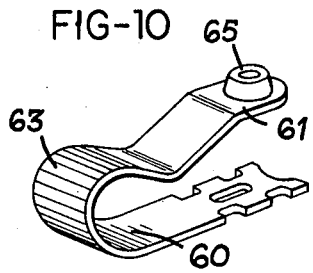
INVENTOR.
FRANK B. WHALEN
BY
Marechal, Biebel, French & Bugg
ATTORNEYS United States Patent Office 2,791,419
Patented May 7, 1957

2,791,419

AUXILIARY SPRING FOR VEHICLES

Frank B. Whalen, Dallas, Tex., assignor to Prior Products, Inc., Dallas, Tex., a corporation of Texas Application April 13, 1954, Serial No. 422,803

4 Claims. (Cl. 267—45)

This invention relates to auxiliary springs for vehicles. Vehicles such as both trucks and pleasure cars which have elliptical or semi-elliptical leaf type springs are generally provided with a bumper which prevents the axle of the vehicle from directly touching the chassis when the vehicle is overloaded or when the wheels strike a bump or other sudden obstruction in the road. The latter condition is more prevalent when the vehicle is carrying an abnormal, though not necessarily excessive load. Every time such a heavily loaded vehicle runs over rough pavement, the driver must slow to an extremely low speed in an attempt to prevent the chassis from striking the axle, and sometimes even this precaution is to no avail.

The impact resulting when the bumper on the spring engages the chassis is undesirable from the standpoint of jostling the passengers or cargo, and also due to sudden stress placed upon the axle and chassis. If it is attempted to overcome this undesirable bumping by providing springs which are stiffer or heavier than required in normal use of the vehicle, the results are not satisfactory, because at light or normal loads such springs give a stiff and jouncing ride, and they are an added expense to make and install.

It is a primary object of the present invention to provide an auxiliary spring for a vehicle which is inexpensive to manufacture and easy to assemble on the vehicle, and which will allow a soft, comfortable ride at normal vehicle loads but exert an extra force tending to support the vehicle chassis when it is loaded abnormally.

Another object of the present invention is to provide such an auxiliary spring which may be attached to a vehicle without altering the normal spring characteristics of the vehicle but which will come into effect when the vehicle is heavily loaded and add to the normal spring resistance.

It is also an object of this invention to provide such an auxiliary spring for a vehicle which may be attached to the leaf spring of the vehicle, and which incorporates adjustable means for embracing the spring U-bolts at the different spacings which exist with different makes and models of vehicles.

Other objects and advatnages of the invention will be apparent from the following description, the accompanying drawing and the appended claims.

In the drawing—

Fig. 1 is a perspective view showing an auxiliary spring assembly constructed in accordance with the present invention and mounted on a section of a vehicle leaf spring;

Fig. 2 is an end view of the complete spring assembly with the axle housing and hanger broken away;

Fig. 3 is a side view of the spring member in the assembly of Figs. 1 and 2;

Fig. 4 is a fragmentary view showing the fixed end of the spring of Fig. 3;

Figs. 5 and 6 are fragmentary views similar to Fig. 4 showing alternative arrangements;

Fig. 7 is a plan view of the assembly of Figs. 1 and 2 with a portion broken away to show the construction of the extension arm;

Fig. 8 is an elevational view of another spring assembly of the present invention utilizing a bracket attached to the vehicle frame member to engage a bumper on the auxiliary spring;

Fig. 9 is a detail view of a lock plate for attaching the bracket of Fig. 8; and Fig. 10 is a perspective view of the spring member in the assembly of Fig. 8.

Referring to the drawing, which illustrates a preferred embodiment of the invention, and particularly to Fig. 1, there is shown a portion of a vehicle chassis illustrated as a frame channel 10, and a leaf spring 11 for supporting the chassis above an axle housing 12. The leaf spring 11 includes a series of horizontally disposed spring strips 13, each having an aperture 14 through its center so that when the strips 13 are assembled, each aperture 14 may be vertically aligned with the others to receive a tie bolt 15 having a head 16 to hold the strips together. To support axle housing 12 in floating relationship below channel 10, a hanger 20 including a saddle plate 21 is fastened to the axle housing. The saddle plate 21 provides a horizontal support for U-bolts 22 and 23 which surround the saddle plate and leaf spring 11 on either side of tie bolt 15, and saddle plate 21 has an opening 24 in its bottom to receive the bolt head 16.

The auxiliary spring of the present invention is indicated generally at 30 and includes a generally U-shaped flat spring metal bar somewhat wider than spring strips 13 and formed to include an upper leg portion 31 terminating in an end portion 32, a curved central portion 33, and a lower leg portion 35. In order to mount the spring 30 on top of spring 11, its lower leg portion 35 is provided with a first pair of notches 36, an aperture 37, and a second pair of notches 38 formed vertically through it. The aperture 37 is located centrally of the width of the bar and is sufficiently large to receive bolt head 16 therein. Since spring 30 is somewhat wider than the spring strips 13, both pairs of notches 36 and 38 are sufficiently deep to allow the legs of each U-bolt 22 and 23 to be received within the opposed notches 36 and 38.

To mount the auxiliary spring on the vehicle, the chassis and axle are suitably supported, the U-bolts 22 and 23 are removed, and lower leg portion 35 is inserted between leaf spring 11 and saddle plate 21 so that bolt head 16 is received within aperture 37. U-bolts 22 and 23 are then slipped over saddle plate 21, through notches 36 and 38, and are fastened around the leaf spring 11. When the U-bolts are tightened, bar 30 is held securely in place with its upper end portion 31 extending above the hanger 20 as shown in Fig. 1.

Different models of vehicles may employ springs which have somewhat different spacing between U-bolts 22 and 23 and tie bolt 15. In the form of the invention shown in Fig. 4, the aperture 37 and both pairs of notches are therefore elongated longitudinally of leg portion 35, to accommodate the U-bolts and the tie bolt head 16 at such varying distances from each other. Fig. 5 shows an alternative arrangement, in which the aperture 37' is just large enough to receive the tie bolt head 16 without any considerable play but both pairs of notches 36 and 38 are elongated, so that while the U-bolts 22 and 23 may be adjusted relative to the tie bolt 14, the position of spring bar 30 is fixed relative to the tie bolt. Similarly, in Fig. 6 one pair of notches 36' is just large enough to receive the legs of one of the U-bolts 22 or 23, so that the position of spring bar 30 is fixed relative to that tie bolt while adjustment may be made by sliding the spring bar 30 relative to bolt head 16 along the elongated aperture 37, and the other U-bolt may be adjusted along the length of elongated notches 38.

In use, bumper means are provided on the end portion 32 of spring 30 for engagement by an adjacent portion of the vehicle frame as it moves downwardly towards spring 11, but in many vehicles the leaf springs do not extend directly below the frame throughout their entire length, so that the hanger 20 and saddle plate 21 may not be vertically aligned with a frame member. To allow the spring bar 30 to contact frame channel 10 under such conditions, there may be provided an extension arm 40 including one end 41 thereof which is formed or curled to fit about one side of upper end portion 32 and to terminate therebelow. A bolt and nut fastener 42 may be employed to secure arm 40 in position across the top of upper end portion 32 as seen in Figs. 2 and 7. With arm 40 in position as shown in Figs. 1, 2 and 7, the other end 43 of the arm extends across end portion 32 and outwardly from the other side of end portion 32 for a substantial distance, and has formed therein an elongated slot 44. A bumper 45 may be fastened by suitable bolt means 47, which pass through slot 44, to the outwardly extending end 43, so as to be adjustable along the length of arm 40.

A modified construction for compensating for this offset of the frame channel 10 and leaf spring 11 is seen in Fig. 8, wherein a Z-bar extension bracket 50, having a center portion 52, an extension arm portion 53, and a clamping arm portion 54, is secured to a frame channel 10 by a lock plate 55. In operative position the center portion 52 is fitted snugly against the side of frame member 10, clamping arm 54 extends below the frame channel, and lock plate 55 extends into the frame channel. A pair of bolts 57 extend through holes 58 in lock plate 55 and cooperating holes 59 in clamping arm 54, to tighten plate 55 and arm 54 about the bottom of channel 10, as seen in Fig. 8. It will be noted that lock plate 55 is curled or waved along its cross-section, as shown in Fig. 9, and when the bolts 57 are tightened, plate 55 is substantially flattened to firmly engage the bottom of channel 10, and at the same time to force the center portion 52 of the Z-bar against the side of channel 10, in the position seen in Fig. 8. When so mounted, the arm portion 53 extends outwardly from the side of channel 10 through a horizontal plane which is spaced below the top of that channel member, and in vertical alignment with the bumper portion of the auxiliary spring. Thus, if the floor boards of the vehicle rest on the channel 10, they will not be damaged by striking of the bumper 45 against arm 53.

A somewhat modified spring bar 60, which has an upper arm 61, and a center portion 63 curved to a greater extent than the center portion 33 of spring bar 30, may be used with bracket 50. Spring bar 60 is desirable where the clearance between the top of leaf spring 11 and frame channel 10 is not very great, as for example when the spring 11 is mounted above axle housing 12, as seen in Fig. 8. A rubber bumper 65 is bolted to the spring bar 60 at the end of its upper arm 61 to engage extension arm 53 when the bracket 50 and spring 60 are mounted on the vehicle. If so desired, the spring 60 may be employed in the assembly of Fig. 1 with an extension arm such as 40 on its upper end.

Under normal loads in operation, the auxiliary springs 30 or 60 are in the positions shown in Figs. 1 and 8, with bumpers 45 or 65 spaced below the frame member 10. When the vehicle is loaded abnormally, or when the wheel and axle receive a severe jolt, the bumper 45 engages frame channel 10, and similarly the bumper 65 engages the extension arm 53, and the resistance of spring bar 30 is added to the normal resistance of leaf spring 11. Thus the auxiliary spring becomes effective when needed, but otherwise it does not alter the normal characteristics of leaf spring 11.

Obviously the shape and dimensions of spring bars 30 and 60, extension arm 40, and extension bracket 50 may all be altered to fit the numerous different models of automobiles and trucks on the market. As one example of a spring unit with which satisfactory results have been obtained, the spring bar 30 is formed from a length of spring steel stock three inches wide by one-quarter inch thick. Lower leg portion 35 has a total length of ten inches, the curved center portion 33 is formed around a two inch radius, upper leg portion 31 is about six and one-eighth inches long, and upper end portion 32 is about two and seven-eighth inches long. Notches 36 and 38 are deep enough to completely enclose the legs of the spring U-bolts, usually about three-quarters of an inch. Aperture 37 is wide enough to receive the head of a spring tie bolt, usually starting from a twenty-one thirty-seconds inch hole. As previously explained, aperture 37 and notches 36 and 38 are elongated, preferably to about three times the diameter of aperture 37, to afford adjustment in the spacings of the U-bolts for various types of leaf springs.

The extension arm 40 may also be formed from three inch by one-quarter inch spring steel stock. Curled end 41 is formed so that it extends back beneath the main portion of the extension arm for a distance of about three-quarters of an inch, with a clearance of at least one-quarter inch between the curled-under end and the bottom of the main portion of arm 40. The overall length of extension arm 40 from the tip of outwardly extending end 43 to the curved portion of end 41 is about five and one-quarter inches. Outwardly extending end 43 is preferably rounded on a one and one-half inch radius about the center of that end, and at that center a hole 44 is formed of about seven-sixteenths inch diameter to receive a bolt or rivet for fastening bumper 45 to the top of the extension arm 40. This hole 44 may also be elongated to about three times its diameter if desired.

An auxiliary spring formed according to the above dimensions will fit 1953 to 1954 models of Chrysler, DeSoto, Dodge and Plymouth passenger cars and station wagons, and will also fit 1948 to 1954 Packards, and 1949 to 1951 Lincolns. When used with the above model cars, the present invention will afford an added capacity of about one thousand pounds. It is of course understood that suitable changes in all the above mentioned dimensions will enable the present invention to be employed on many other automobiles and trucks.

While the apparatus herein described constitutes a preferred embodiment of the invention, it is to be understood that the invention is not limited to this precise apparatus, and that changes may be made therein without departing from the scope of the invention which is defined in the appended claims.

What is claimed is:

1. An auxiliary spring for a vehicle having a leaf spring including a series of horizontal elongated spring leaves joined together at their centers in longitudinal parallel relationship by a pair of U-bolts and a tie bolt passing through vertically aligned apertures in the center of the leaves between the U-bolts, said auxiliary spring comprising a bar of spring metal slightly greater in width than said leaves and bent back on itself to provide a generally U-shaped member having upper and lower substantially horizontal legs, said lower leg being adapted to rest on the uppermost of the leaves beneath the bights of said U-bolts and having a central aperture therethrough for receiving said tie bolt, means on the side edges of said lower leg for operatively engaging said U-bolts at variable spacings thereof, an extension arm secured across the end of said upper leg, one end of said extension arm being bent around a side of said upper leg, the other end of said extension arm extending outwardly beyond the opposite side of said upper leg and including rubber bumper means supported outwardly from the opposite side of said upper leg, and said other end of said extension arm having an elongated hole formed therethrough providing for adjustment of said bumper means toward and away from said upper leg.

2. An auxiliary spring for a vehicle having a leaf spring including a series of generally horizontal elongated spring leaves joined together at their centers in longitudinal parallel relationship by a pair of U-bolts and a tie bolt passing through vertically aligned apertures in the center of the leaves between the U-bolts, said auxiliary spring comprising a bar of spring metal bent to provide a generally U-shaped member having upper and lower legs, said lower leg being slightly wider than said leaves and being adapted to lie on the uppermost of said leaves beneath the bights of the U-bolts, said upper leg including adjustably mounted rubber bumper means for engaging a part of the vehicle above the leaf spring, said bar having first and second pairs of notches formed opposite each other in the sides of said lower leg near the end thereof, at least one of said pairs of notches being elongated longitudinally of said bar to receive said U-bolts at variable distances relative to each other, and said bar having an aperture extended vertically therethrough between said first and second pairs of notches and large enough to receive said tie bolt.

3. An auxiliary spring for a vehicle having a leaf spring including a series of generally horizontal elongated spring leaves joined together at their centers in longitudinal parallel relationship by a pair of U-bolts and a tie bolt passing through vertically aligned apertures in the center of said leaves between the U-bolts, said auxiliary spring comprising a bar of spring metal bent to provide a generally U-shaped member having upper and lower legs, said lower leg being slightly wider than said leaves and being adapted to lie on the uppermost of the leaves beneath the bights of the U-bolts, said upper leg including adjustably mounted rubber bumper means for engaging a part of the vehicle above the leaf spring, said bar having first and second pairs of notches formed opposite each other in the sides of said lower leg near the end thereof, both said pairs of notches being elongated longitudinally of said bar to receive said U-bolts at variable distances to each other, said bar also having an aperture large enough to receive one end of said tie bolt formed vertically therethrough between said first and second pairs of notches, and said aperture being elongated longitudinally of said bar to receive said tie bolt at variable distances relative to said U-bolts.

4. An auxiliary spring for a vehicle having a leaf spring including a series of horizontal elongated spring leaves joined together at their centers in longitudinal parallel relationship by a pair of U-bolts and a tie bolt passing vertically through aligned apertures in the centers of said leaves between said U-bolts, said auxiliary spring comprising a bar of spring metal slightly greater in width than said leaves and bent back on itself to provide a generally U-shaped member having upper and lower substantially horizontal legs, said lower leg being adapted to rest on the uppermost of said leaves beneath the bights of said U-bolts, said lower leg having a central aperture therein for receiving said tie bolt and pairs of notches formed in opposite sides thereof for receiving said U-bolts, at least some of said pairs of notches being elongated to receive said U-bolts at different distances relative to each other, an extension arm secured across the end of said upper leg, one end of said arm being bent around a side of said upper leg, and the other end of said arm extending outwardly beyond the opposite side of said leg and including rubber bumper means supported thereon outwardly from the opposite side of said upper leg.

References Cited in the file of this patent
UNITED STATES PATENTS

| 1,086,182 | Jackson | Feb 3, 1914 |
| 1,389,591 | Magin et al. | Sept. 6, 1921 |
| 1,601,110 | Crouch | Sept. 28, 1926 |
| 1,959,118 | Uffelman | May 15, 1934 |